United States Patent [19]

Scholtholt et al.

[11] Patent Number: 5,033,981

[45] Date of Patent: Jul. 23, 1991

[54] DISTRIBUTOR STRIP FOR TELECOMMUNICATION SYSTEMS HAVING SEPARATING CONTACTS

[75] Inventors: Hans Scholtholt, Munich; Ewald Steiner, Berg, both of Fed. Rep. of Germany

[73] Assignee: Siemens Aktiengesellschaft, Munich

[21] Appl. No.: 534,507

[22] Filed: Jun. 7, 1990

[30] Foreign Application Priority Data

Jun. 15, 1989 [DE] Fed. Rep. of Germany ....... 3919623

[51] Int. Cl.⁵ .......................... H01R 9/26; H01R 9/22
[52] U.S. Cl. .................................. 439/716; 439/398; 439/709
[58] Field of Search ............... 439/708, 715, 723, 395, 439/398, 709, 716, 724

[56] References Cited

U.S. PATENT DOCUMENTS

| | | | |
|---|---|---|---|
| 4,118,091 | 10/1978 | Frisby | 439/401 X |
| 4,262,173 | 4/1981 | Saligny | 179/98 |
| 4,533,196 | 8/1985 | Forberg et al. | 439/404 |
| 4,533,200 | 8/1985 | Wilson | 439/395 |
| 4,547,034 | 10/1985 | Forberg et al. | 439/406 |
| 4,781,613 | 11/1988 | Saligny | 439/709 X |
| 4,846,735 | 7/1989 | Teichler et al. | 439/709 |

FOREIGN PATENT DOCUMENTS 0180000 5/1986 European Pat. Off. .

Primary Examiner—David L. Pirlot
Assistant Examiner—Julie R. Daulton
Attorney, Agent, or Firm—Hill, Van Santen, Steadman & Simpson

[57] ABSTRACT

A distributor strip has a service side provided with terminal elements for incoming lines that are to be frequently changed. The terminal elements for the outgoing lines that are to be seldom changed are arranged at the rear side of the distributor strip. The terminal elements are continued in contact pairs that terminate in separate contacts. The contacts are arranged near the rear side and can be separated by a respective pin of a separating plug inserted from the service side.

7 Claims, 1 Drawing Sheet

DISTRIBUTOR STRIP FOR TELECOMMUNICATION SYSTEMS HAVING SEPARATING CONTACTS

BACKGROUND OF THE INVENTION

1. Field of the Invention

The present invention relates to a distributor strip for telecommunication systems, particularly telephone systems, having separating contacts arranged in rows.

2. Description of the Prior Art

The German published application 34 35 721, for example, discloses such a distributor strip. In accordance therewith, a separating contact is respectively formed by contact poles of two contact pieces whose free ends project from the distributor strip at the servicing side and are fashioned as terminal elements thereat for incoming and outgoing lines. The contact parts are fashioned in the inside of the distributor strip as contact springs that are bent back arcuately onto themselves and have the contact poles at their spring ends. The contact poles are arranged in the region of the rear side of the distributor strip. A plug can be inserted from the servicing side between the contact poles. Due to the arrangement of the contact poles close to the rear side of the strip, the contact springs point in the plug-in direction of the plugs and form a favorable ramp bevel for the plugs. The contact parts are multiply bent over onto themselves and are mirror-symmetrically arranged relative to one another, so that a great overall width of the distributor strip results.

Proceeding from the end face of the distributor strip, the lines incoming from the subscribers are connected to a double row of terminal elements. The outgoing lines leading to the switching equipment are brought to the opposite double row of terminal elements proceeding from the rear side. U.S. Pat. No. 4,262,173, fully incorporated herein by this reference, also discloses that the terminals elements for the incoming lines that are frequently changed be arranged at the service side. The terminal elements for the outgoing lines that are seldom changed lie at the rear side of the distributor strip that faces away from the service side. Contact parts project from both terminal elements on a straight line into the interior of the distributor strip. One of these contact parts is fashioned as a contact spring that overlaps the cooperating contact part and, together therewith, form the central contact location that can be parted by a separating plug that is inserted at the service side.

SUMMARY OF THE INVENTION

The object of the present invention is to reduce the manufacturing expense of the distributor strip and to make the dimensions thereof smaller.

The above object is achieved in a distributor strip for telecommunication systems, particularly telephone systems, having separating contacts arranged in rows, whereby a separating contact is respectively formed by contact poles of two contact parts whose free ends comprises terminal elements for incoming and outgoing lines, whereby at least one of the contact parts is fashioned as a contact spring that has the contact pole at its spring end, whereby the terminals elements for the incoming lines that are frequently changed are arranged at the service side and the terminal elements for the outgoing lines that are seldom changed lie at the rear side of the distributor strip, and is particularly characterized in that the contact part for these lines extends from the rear side into the proximity of the service side, is bent back from the latter to the rear side and thereat carries the contact pole, and in that the contact part for the incoming lines extends in an approximately extended line from the surface line to the rear side. In accordance therewith, the contact part for the outgoing lines that are seldom changed is conducted from the rear side to the service side and is folded back therefrom to the rear side. As a result thereof, the two contact parts overlap over their entire lengths and are conducted to the front side proceeding from the contact location. The folded contact part forms a very slight ramp bevel for the separating plug, so that the latter can be easily inserted. Since the bent-back leg projects in the plug-in direction, the frictional forces that arise contribute to an easier opening of the contact location.

According to a feature of the invention, the distributor strip is characterized in that the contact part extending in essentially straight-line fashion for the incoming lines is introduced into receptacle changes of the housing of the distributor strip and has a slight bend toward the other contact part in the region of its rear end. As a result of this feature, the contact part having the contact pole is bent into the plugging region of the separating plug, so that the lateral forces acting on the plug can be compensated.

According to another feature of the invention, the distributor strip is characterized in that the straight-line contact part comprises at least one catch tab at its rear end that is supported at a shoulder of the housing. As a result of this feature, the straight-line contact part can be slipped into the housing at the surfacing side in a simple manner and can be fixed therein.

According to another feature of the invention, the distributor strip is characterized in that the other contact part is bent back onto itself and is introduced into a different receptacle chamber of the housing proceeding from the rear side of the housing and comprises a torn-out interlock tab that projects into a depression of the housing under the inherent tension of the contact part. As a result of this feature, the angled contact part can, for example, be inserted into the housing proceeding from the rear side and can be fixed therein. The interlock tab need not be inherently resiliently constructed.

According to another feature of the invention, the distributor strip is characterized in that the depression is accessible proceeding from the servicing side. This feature enables an unlocking of the contact parts proceeding from the front side using an unlocking plug.

According to another feature of the invention, the distributor is characterized in that the housing is fashioned of a single story and can be placed onto a bottom plate that is provided with passages for the outgoing terminal elements. This one-story housing feature provides that the housing can be manufactured in a cost-effective manner.

According to another feature of the invention, the distributor strip is characterized in that a plurality of distributor strips can be placed onto a common bottom plate. The common bottom plate replaces individual bottom plates heretofore known in the art. A particular advantage is that the bottom plate can carry a strip-overlapping labeling that marks the position of the individual contact parts.

According to another feature of the invention, the distributor strip is characterized in that the bottom plate is constructed as a printed circuitboard, and that the terminal elements for the outgoing lines can be introduced into plated-through holes of the printed circuitboard. The bottom plate can therefore be a part of an electrical functional unit to which the incoming lines are directly connected. The printed circuitboard, however, can also be part of a separate distributor.

BRIEF DESCRIPTION OF THE DRAWING

Other objects, features and advantages of the invention, its organization, construction and operation will be best understood from the following detailed description, taken in conjunction with the accompanying drawing, on which.

DESCRIPTION OF THE PREFERRED EMBODIMENTS

Figure 1:
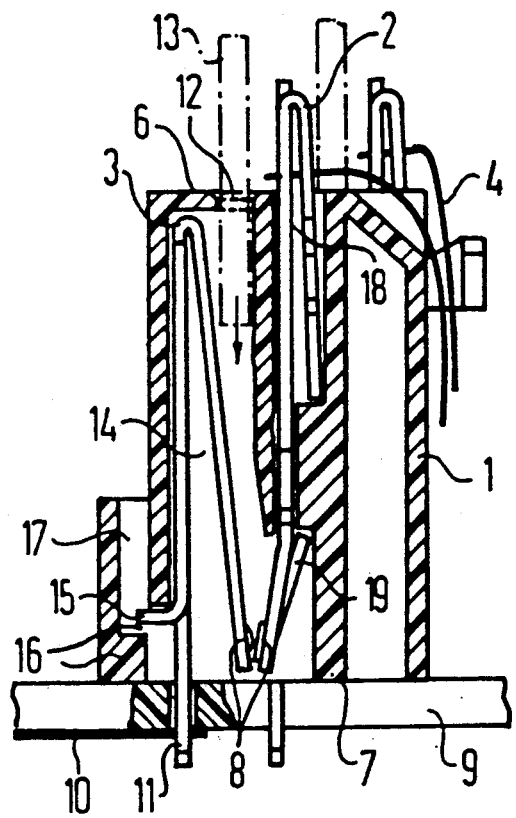
FIG. 1 is a sectional view through a distributor strip comprising contact parts, the view being taken generally along the line I—I of FIG. 4.
Figure 4:
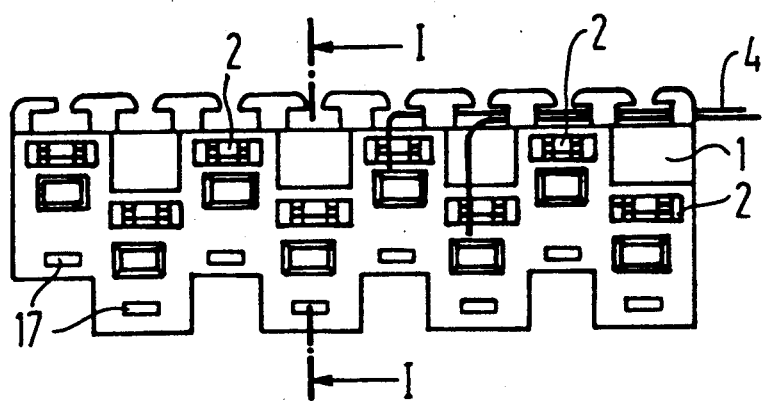
FIG. 4 is a reduced scale plan view of the distributor strip of FIG. 1.

Referring to FIG. 1, a pair of contact parts 2 and 3 are inserted into a housing 1 of a distributor strip. The distribution of the contact parts 2 and 3 in the distributor strip may be seen from FIG. 4. In accordance therewith, the contact parts 2 and 3 are arranged in two different rows which are offset relative to one another, whereby the rows extend in the longitudinal direction of the strip.

Lines 4 incoming from the subscribers are connected to terminal elements 5 fashioned as knife-edge posts (commonly called insulation-pierce or insulation-disruption contacts) that are located at the servicing side of the distributor strips. They are part of the contact parts 2 that essentially extend on a straight line to the rear side 7 of the distributor strip. They are produced with contact poles 8 at the end adjacent the rear side 7.

The distributor strip has its rear side 7 placed onto a printed circuitboard 9 that contains outgoing lines 10 in the form of printed interconnects. These printed interconnects end in contact locations for pin-like terminal elements 11 of the contact parts 3. The contact parts 3 are bent V-shaped and extend from the printed circuitboard 9 up into the proximity of the servicing side 6 and are bent back at that location towards the rear side 7 at an acute angle. This leg acts as a leaf spring that likewise has a contact pole 8 at its free end that meets the corresponding cooperating contact pole 8 of the other contact part 2.

The housing 1 has the servicing side provided with openings 12 therethrough for receiving plug pins 13 indicated with dot-dash lines. These are inserted into the housing 1 in the direction indicated by the arrow and thereby encounter the obliquely-residing spring leg of the contact element 3. The spring leg of the contact element 3 is pressed by the plug pin 13 away from the cooperating contact such that the contacts 8 are separated as a result thereof.

The contact parts 3 for the outgoing lines are inserted into receptacle chambers 14 of the housing 1 proceeding from the rear side 7 and are held therein with a bent-off interlock tab 15 that engages into a lateral depression 16 of the housing 1 due to the intrinsic tension of the contact part. The housing 1 is provided with an unlocking opening 17 through which the interlock tab 15 is accessible from the servicing side for an unlocking tool.

The contact parts 2 for the incoming lines 4 are introduced into the receptacle chambers 18 of the housing 1 proceeding from the servicing side. At its rear end, the contact part comprises a resiliently-spread latch tab 19 that engages behind a shoulder of the housing 1. The contact part 2 is therefore also reliably anchored in the housing 1.

Figure 2:
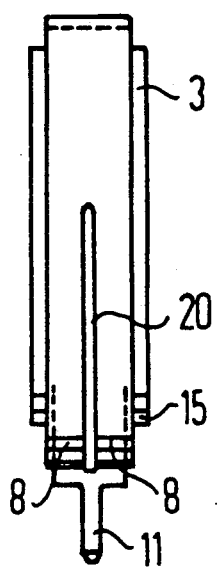
FIGS. 2 and 3 are views of the contact parts of FIG. 1.

The contact part 3 for the outgoing lines 10 may be seen in a side view in FIG. 2, whereby the interlock tabs 15 may particularly be seen as tabs that are laterally pulled out. The resilient leg comprises a central separating slot 20 as a result whereof the contact pole 8 acts as a double contact.

Figure 3:
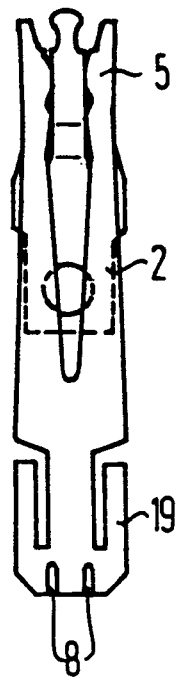

It may be seen in FIG. 3 that the terminal element 5 is constructed as a double knife-edge terminal post that is suitable for the connection of two outgoing lines 4. This function is particularly advantageous given modification jobs wherein the new connections must already be laid before the old connections are separated.

The rear end of the contact part 2 is likewise provided with two contact poles 8 that cross with the cooperating poles of the contact part 3. The catch tabs 19 extend laterally from the contact poles 8 in the direction of the servicing side.

Although we have described our invention by reference to particular illustrative embodiments thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. A distributor strip for connecting outgoing switch equipment lines to incoming subscriber lines in telecommunication systems, comprising:
    an elongate housing including a service side and a rear side;
    a plurality of separating contact structures mounted in said housing in rows;
    each of said separating contact structures including first and second resilient contact elements;
    said first contact element including a connecting portion comprising a bend extending beyond said service side of said housing and adapted to connection to at least one incoming subscriber line;
    an inner distal end and at least one first contact on said inner distal end;
    said second contact element including first and second sections each comprising a distal end, said second contact element bent back upon itself such that said second section overlie said first section, and at least one second contact on said distal end of said second section;
    said first and second contact elements positioned in said housing such that said at least one second contact normally engages said at least one first contact is separable therefrom upon deflection of said second section of said second contact element;
    said distal end of said first section of said second contact element including a pin-shaped projection extending beyond said rear side of said housing for connection to a respective outgoing switching equipment line;

said housing including wall means defining a plurality of chamber structures arranged in rows, each of said chamber structures including first and second chambers and an opening defining a common communication zone therebetween;

each of said first contact elements mounted in a respective first chamber and the cooperating second contact element mounted in the corresponding second chamber with said contacts engaging via the respective common communication zone;

each of said distal ends of said first contact elements is bent to extend through the respective common communication zone into the corresponding and respective second chamber;

each of said second chambers includes an opening defining an edge; and each of said first sections of said second contact elements comprises a tab projecting through said opening and limited against movement by said edge.

2. The distributor strip of claim 7, wherein:

said housing a plurality of first shoulders each in a respective first chamber and facing said rear sides;

each of said first contacts comprises a tab extending at an angle to said inner distal end and including an edge for engaging the respective first shoulder.

3. The distributor strip of claim 1, wherein:

said housing includes a plurality of first shoulders each in a respective first chamber facing said rear side, and a plurality of second shoulders each in a respective first chamber spaced from and facing opposite said first shoulder, and an opening through said front side with said connecting section extending therethrough;

said first contact elements each include first and second sections joined by a respective connecting portion, each of said first contact elements bent back upon itself such that said second section overlie said first section with said connecting portions therebetween, each of said sections including a distal end with said distal end of said first section constituting said inner distal end; and each of said first contact elements is insertable into the respective first chamber through the respective opening with said distal end of said second section engaging said second shoulder and a tab extending from said first section at an angle generally opposed to the direction of insertion and including an edge for engaging behind said first shoulder to secure said first contact elements.

4. The distributor strip of claim 1, wherein:

said housing comprises recess means communicating with said openings for access by a contact removal tool for disengaging said tabs.

5. The distributor strip of claim 1, wherein:

each of said chamber structures includes first and second chambers and said communication zone thereof opening through said rear side of said housing; and further comprising in combination therewith a bottom plate and a plurality of outgoing switching equipment lines on said bottom plate, said bottom plate supporting said rear side of said housing and said pin-shaped projections of said second contact elements connected to said outgoing switching equipment lines.

6. The distributor strip of claim 5, and further comprising:

a plurality of said distributor strips supported on said bottom plate with said pin-shaped projections connected to respective ones of said outgoing switching equipment lines.

7. The distributor strip of claim 5, wherein:

said bottom plate comprises a printed circuitboard including said outgoing switching equipment lines as printed conductors thereon; and said pin-shaped projections extend through said printed circuitboard to contact said conductors.

* * * * *